United States Patent
Hittini et al.

(10) Patent No.: US 11,814,510 B2
(45) Date of Patent: Nov. 14, 2023

(54) BUFFING DUST WASTE/POLYSTYRENE THERMAL INSULATOR

(71) Applicant: UNITED ARAB EMIRATES UNIVERSITY, Al Ain (AE)

(72) Inventors: Waseem Hittini, Al Ain (AE); Abdelhamid Ismail Mourad, Al Ain (AE); Basim Abu-Jdayil, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 1168 days.

(21) Appl. No.: 16/293,405

(22) Filed: Mar. 5, 2019

(65) Prior Publication Data
US 2020/0283609 A1  Sep. 10, 2020

(51) Int. Cl.
| | |
|---|---|
| C08L 25/06 | (2006.01) |
| E04B 1/76 | (2006.01) |
| C08K 11/00 | (2006.01) |
| B29C 43/58 | (2006.01) |
| B29C 43/00 | (2006.01) |
| B29B 13/02 | (2006.01) |
| B29K 25/00 | (2006.01) |

(52) U.S. Cl.
CPC ........... *C08L 25/06* (2013.01); *B29C 43/003* (2013.01); *B29C 43/58* (2013.01); *C08K 11/005* (2013.01); *E04B 1/76* (2013.01); *B29B 13/022* (2013.01); *B29C 2043/5808* (2013.01); *B29C 2043/5816* (2013.01); *B29K 2025/06* (2013.01)

(58) Field of Classification Search
None
See application file for complete search history.

(56) References Cited

U.S. PATENT DOCUMENTS
9,138,969 B2  9/2015  Alsewailem

FOREIGN PATENT DOCUMENTS
| | | |
|---|---|---|
| CN | 101717238 A | 6/2010 |
| RU | 1810362 A1 | 4/1993 |

OTHER PUBLICATIONS

Poletto et al., "Characterization of composites based on expanded polystyrene wastes and wood flour", Waste Management (2011), vol. 31, pp. 779-784.
Basak et al., "Plasticizing Polystyrene with Waste Leather Buffing Dust: a Drive Towards Waste-Polymer Composite Synthesis", Polymers and Polymer Composites (2012), vol. 20, No. 3, pp. 279-288.

*Primary Examiner* — Robert J Grun
(74) *Attorney, Agent, or Firm* — Nath, Goldberg & Meyer; Richard C. Litman

(57) ABSTRACT

The buffing dust waste/polystyrene thermal insulator is a polymer composite containing 0.1%-25% by weight buffing dust waste from a leather tannery, the balance being polystyrene. The composite has extremely low thermal conductivity (e.g., 0.0447 W/m-K for a composite 10% budding dust by weight), making it a good insulator, while still having relatively high mechanical properties. The thermal insulator is made by mixing the buffing dust with the polystyrene polymer in a twin-screw extruder and pouring the mixture into a steel mold. The mold is heated and compressed in a hot press machine, e.g., at 500 kg force at 180° C. for 20 minutes, which may be followed by 500 kg force at 125° C. for an additional 20 minutes. The resulting composite polymer is suitable for use as thermal insulation in buildings.

15 Claims, 6 Drawing Sheets

BUFFING DUST WASTE/POLYSTYRENE THERMAL INSULATOR

BACKGROUND

1. Field

The disclosure of the present patent application relates to polymer composites, and particularly to a buffing dust waste/polystyrene thermal insulator that is a thermal insulation material made by mixing polystyrene with buffing dust (which is a waste material produced as a by-product in tanneries) in an extruder and compressing the resulting mixture.

2. Description of the Related Art

Leather production processes create large amounts of waste worldwide, adding to environmental pollution. Tannery wastes include tanned splits, shaving and trimming, dyed/finished Waste, and buffing dust (BD). In leather production, just 20% of the material weight is converted to final product. About 35% to 40% of tannery solid waste is BD and chrome shavings. It has been estimated that two to six kg of buffing waste is produced for every ton of leather processing. For example, Indian tanneries produce around 600,000 tons of leather annually, which results in 36 million kg of BD waste a year.

Polystyrene and polystyrene composites are frequently used in building materials, particularly for thermal insulation. Polystyrene is a non-biodegradable polymer. Although efforts to recycle polystyrene are increasing, an environmentally friendly alternative may be to reduce the production of polystyrene by developing composites with other waste materials, an alternative that may be more attractive if the composites have improved thermal insulation properties compared to pure polystyrene.

Thus, a buffing dust waste/polystyrene thermal insulator solving the aforementioned problems is desired.

SUMMARY

The buffing dust waste/polystyrene thermal insulator is a polymer composite containing 0.1%-25% by weight buffing dust waste from a leather tannery, the balance being polystyrene. The composite has extremely low thermal conductivity (e.g., 0.0447 W/m-K for a composite 10% budding dust by weight), making it a good insulator, while still having relatively high mechanical properties. The thermal insulator is made by mixing the buffing dust with the polystyrene polymer in a twin-screw extruder and pouring the mixture into a steel mold. The mold is heated and compressed in a hot press machine, e.g., at 500 kg force at 180° C. for 20 minutes, which may be followed by 500 kg force at 125° C. for an additional 20 minutes. The resulting composite polymer is suitable for use as thermal insulation in buildings.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The buffing dust waste/polystyrene thermal insulator is a polymer composite containing 0.1%-25% by weight buffing dust waste from a leather tannery, the balance being polystyrene. The composite has extremely low thermal conductivity (e.g., 0.0447 W/m-K for a composite 10% budding dust by weight), making it a good insulator, while still having relatively high mechanical properties. The thermal insulator is made by mixing the buffing dust with the polystyrene polymer in a twin-screw extruder and pouring the mixture into a steel mold. The mold is heated and compressed in a hot press machine, e.g., at 500 kg force at 180° C. for 20 minutes, which may be followed by 500 kg force at 125° C. for an additional 20 minutes. The resulting composite polymer is suitable for use as thermal insulation in buildings.

In the following examples, buffing dust (BD) powder at various weight percentages (0-25 wt %) was mixed with polystyrene (PS) thermoplastic polymer using a Thermo Scientific™ HAAKE PolyLab OS twin-screw extruder and poured into steel molds. The buffing dust BD used in this study was sourced from Al Khaznah Tannery in Abu Dhabi, UAE. The information provided to us is that, the buffing dust consisted of carbon, organic nitrogen and ammonia, chromium and ash. The particle size of the BD was less than 300 micrometers. To prevent the specimens from sticking to the mold, the mold space surfaces were sprayed with a release agent. The molds used were of various shapes and sizes to test for thermal conductivity ad for compression, tensile, flexure, and water retention properties according to ASTM C1045-07, ASTM D 695-15, ASTM D638-14, ASTM D570-98 and ASTM D 790-02 standards. To produce the BD-PS composites, the BD was added to PS beads (resin) and the resulting materials were heated and compressed in the hot press machine. In the compression process of the samples in the hot press, the heating cycle, which was followed to eliminate and/or minimize the size and number of voids, consists of two segments with different parameters: (1) a force of 500 kg at 180 C for 20 minutes, and (2) a 500 kg force at 125 C for 20 minutes. The second segment was added to prevent the mold from opening due to the hot gases generated inside the mold. For all other test samples, only the first segment was applied (i.e., a force of 500 kg at 180 C for 20 minutes).

Figure 1:
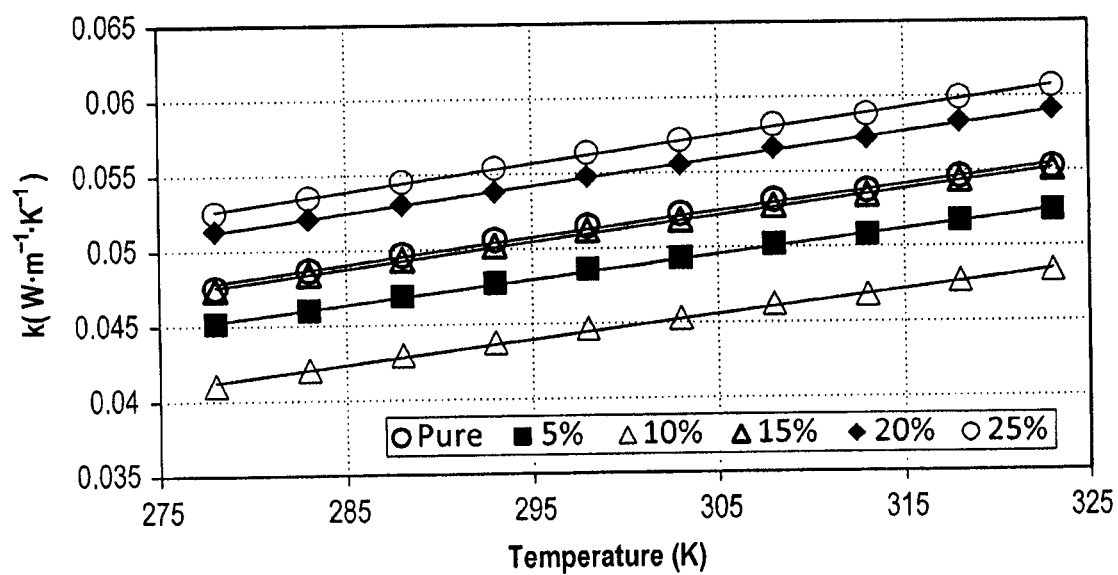
FIG. 1 is a plot of thermal conductivity as a function of temperature for the buffing dust waste/polystyrene thermal insulator composite material at buffing dust concentrations of 0 wt %, 5 wt %, 10 wt %, 15 wt %, 20 wt %, and 25 wt %, respectively.

The buffing dust waste/polystyrene thermal insulator polymer composite, made as described above, has extremely low thermal conductivity (i.e., 0.0447 W/m-K for the 10 wt % BD-PS composite) with relatively high mechanical properties. The thermal conductivity of each sample was measured using a Lasercomp FOX-200. This instrument employs the steady state method to determine thermal conductivity by measuring the temperature gradient and the input power, in accordance with ASTM C1045-07. As shown in FIG. 1, the thermal conductivity, k, was reduced to its lowest value (0.0447 W/m-K) at 10 wt % BD content prior to increasing again for the 15 wt %, 20 wt %, and 25 wt % buffing dust composites. The k value of the 10 wt % BD composite is 13.29% lower than that for pure polystyrene prepared using the described method. Furthermore, the k value of the 15 wt % BD composite was almost equal to that of pure polystyrene (0.051505 W/m-K). There are two competing factors governing the trend of the thermal conductivity of the polymer composites shown in FIG. 1. These are the content of buffing dust in the composites and the number of air voids in the composites. The k value of BD waste is within the range 0.024-0.026 W/m-K, which is less than half of the k value of polystyrene, and incorporating BD produces a composite of reduced k value compared to that of PS. This reduction is observed up to 10 wt % BD content. However, BD particles start to fill in the air voids, which affects the k value and reduces its number, and consequently produces a composite of relatively higher k, as shown in FIG. 1. In other words, while the positive effect of replacing a portion of the PS matrix with BD was dominant for filler contents less than 10 wt %, the effect of reducing air voids from the composite was dominant for filler content higher than 10 wt %. The BD-PS composites have superior thermal insulation capacity with thermal conductivity varied between 0.0447 and 0.056395 W/m-k.

Figure 2A:
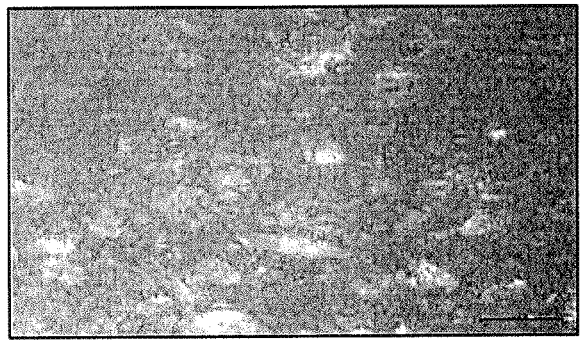
FIG. 2A is a photomicrograph of pure polystyrene.
Figure 2B:
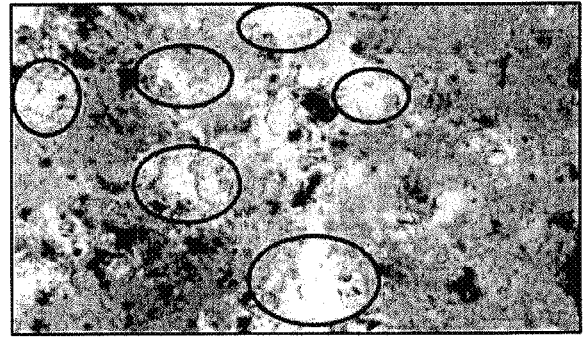
FIG. 2B is a photomicrograph of an extruded polymer composite of polystyrene and 10 wt % buffing dust, the locations of air voids being circled.
Figure 2C:
FIG. 2C is a photomicrograph of an extruded polymer composite of polystyrene and 15 wt % buffing dust, the locations of air voids being circled.
Figure 2D:
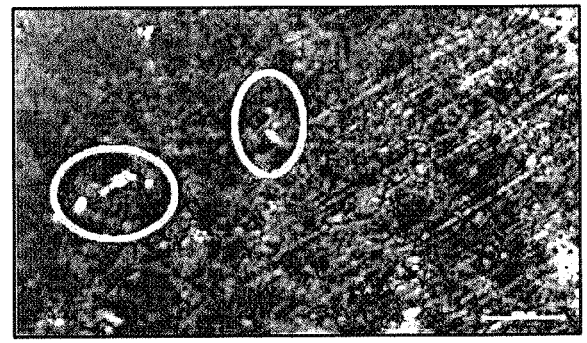
FIG. 2D is a photomicrograph of an extruded polymer composite of polystyrene and 25 wt % buffing dust, the locations of air voids being circled.
Figure 3:
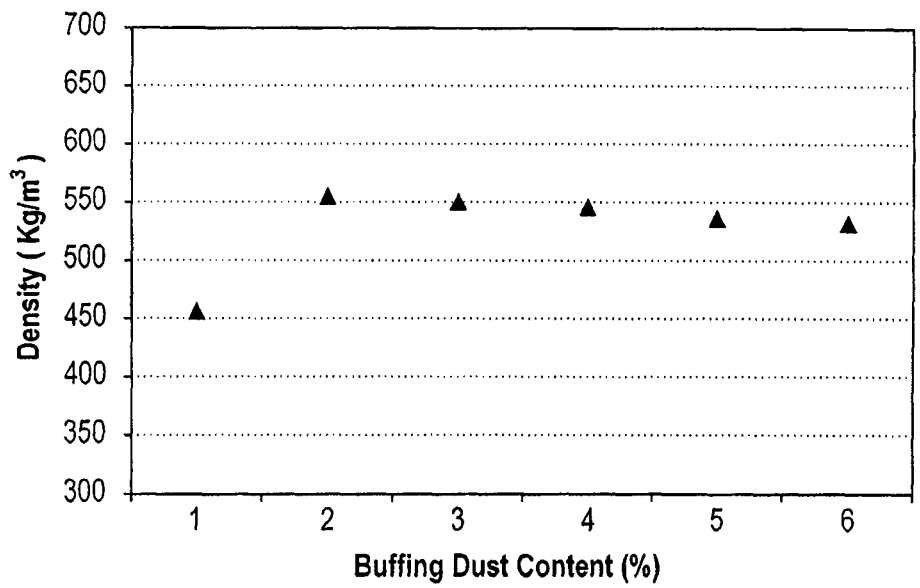
FIG. 3 is a plot of density as a function of buffing dust content (wt %) for the buffing dust waste/polystyrene thermal insulator composite material.

FIGS. 2A-2D are photomicrographs comparing polystyrene to the buffing dust waste/polystyrene polymer composites with increasing buffing dust content. In this research, two kinds of microscopy were used, optical microscope and SEM. The optical microscope was used to investigate void size and distribution. An Olympus DP22 optical microscope was used for the void investigations. The scale is 100 micrometers and the magnification is ×10 in FIG. 2A-2D. FIG. 2A shows pure polystyrene where white regions represent air voids in the sample. FIGS. 2B-2D are composites with 10 wt %, 15 wt % and 25 wt % buffing dust content, and the circled areas represent air voids in the composites. FIG. 3 demonstrates the effect of increasing buffing dust content on the density of the composites. Density is the ratio of the weight to its volume. The weight of the samples was determined up to four significant digits, and the sample volume was determined using a caliper to two significant digits. The pure PS density was measured from the prepared cylindrical samples using the above method. The filler density was determined by finding the weight of a powder sample and dividing it by the volume of the weighted sample. The linear mixing rule was used to calculate the theoretical density of the prepared composites (Equation 1), as follows:

$$\rho_{composite} = \left( \frac{w_{matrix}}{\rho_{matrix}} + \frac{w_{filler}}{\rho_{filler}} \right)^{-1} \quad (1)$$

where $\rho_{composite}$, $\rho_{matrix}$, and $\rho_{filler}$ are the densities of composite, PS, and BD, respectively. In addition, $w_{matrix}$ and $w_{filler}$ are the weight fraction of PS and BD.

The BD density was measured to be 326 kg/m$^3$, while the polystyrene density was measured to be 577 kg/m$^3$. It was observed that composite density decreased with increasing filler content due to the low density of BD. The increase in density noted for the 5 wt % BD composite was due to the presence of air voids in the pure polystyrene that were filled by the BD filler. Optical microscopy was used to investigate the density of the voids and their size. The images of FIGS. 2A-2D show that the number of voids reduces with increasing filler content. The results show that the BD-PS composites had superior density when compared with BD-cement and BD-plaster composites (see Lakrafli et al., "Effect of wet blue chrome shaving and buffing dust of leather industry on the thermal conductivity of cement and plaster based materials", *Construction and Building Materials*, vol. 30, pp. 590-596 (2012) for literature values for cement and plaster composites).

Figure 4:
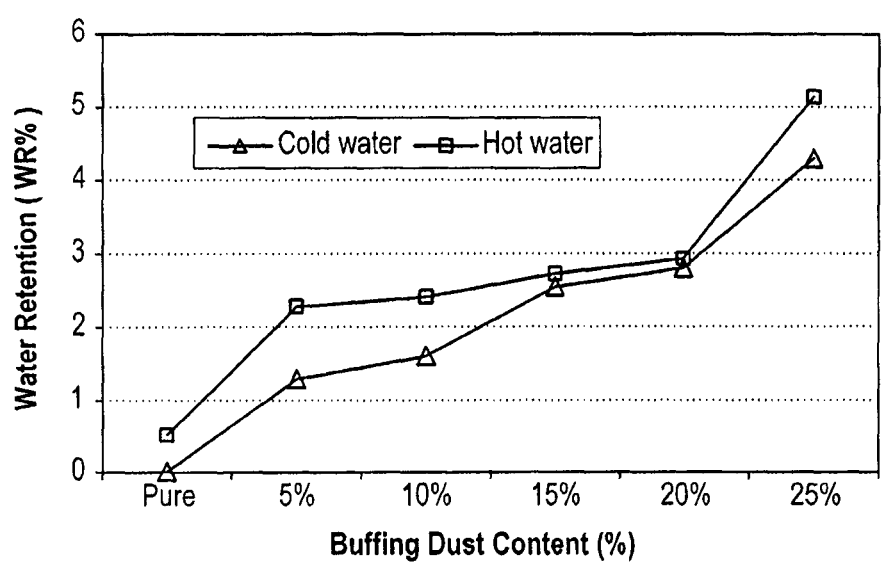
FIG. 4 is a plot of water retention as a function of buffing dust content (wt %) for the buffing dust waste/polystyrene thermal insulator composite material in cold water (25° C.) and in hot water (50° C.).
Figure 5:
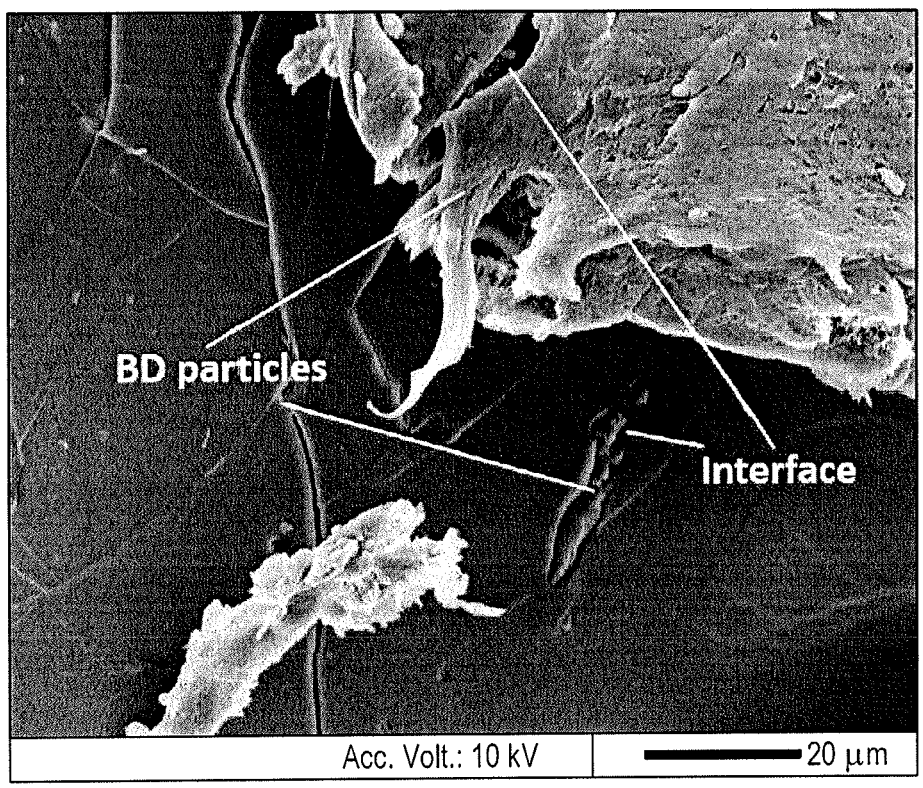
FIG. 5 is a SEM micrograph of a sample buffing dust waste/polystyrene thermal insulator composite material with 25 wt % buffing dust content, showing poor buffing dust/polystyrene interface.

FIG. 4 shows the water retention behavior of the BD-PS composites after 24 hours. As the samples were less dense than water, each was attached to a heavy weight with plastic string to ensure complete immersion. In the two tests, samples were fully immersed in distilled water at either 25° C. or 50° C. for 24 hours. The samples were removed from the water at frequent intervals during the test period, dried with a dry cloth and weighed to the nearest 0.001 g. In the cold water (25° C.) tests, the water retention values for the 5-BD, 10-BD, 15-BD, 20-BD, and 25-BD composites were 1.29%, 1.61%, 2.55%, 2.80%, and 4.29%, respectfully. As observed, water retention among samples immersed in hot water (50° C.) was higher than for those immersed in cold water. FIG. 4 shows also that water retention rises with increasing BD content. This could be due to the poor BD filler—PS matrix interface in some places (see FIG. 5). For both tests, the water retention of all composites with less than 20 wt % filler content BD was less than 3%. Furthermore, the maximum water retention value was found to be about 5% for the two tests at 25 wt %. This value could be further improved with more proper mixing.

A universal testing machine (MTS model MH/20) with a load cell capacity of 100 kN was used to determine the compression strength of the produced composite. The test was slopped when the specimen fractured or the load value reduced by 10% of the maximum load. Otherwise, the test was stopped manually when a specific contraction value was reached. All compression tests were performed at room temperature with an overhead speed of 1 mm/min, in accordance with ASTM D 695-15 standard.

The same machine was used to determine the tensile strength of the produced composite. Samples were installed between the fixed and movable jaws. All tests ended when the specimen fractured. All tensile tests were performed at room temperature with a 2 mm/min overhead speed, in accordance with ASTM D638-14 standard.

The flexural strength of composites was measured using the same machine with a load cell capacity of 5 kN. Samples were measured using a three-point bending test at an overhead speed of 2 mm/min, in accordance with ASTM D 790-02. All tests were conducted at room temperature and stopped when the sample fractured. For all tests, the results of three samples for each filler content percentage were averaged.

Figure 6:
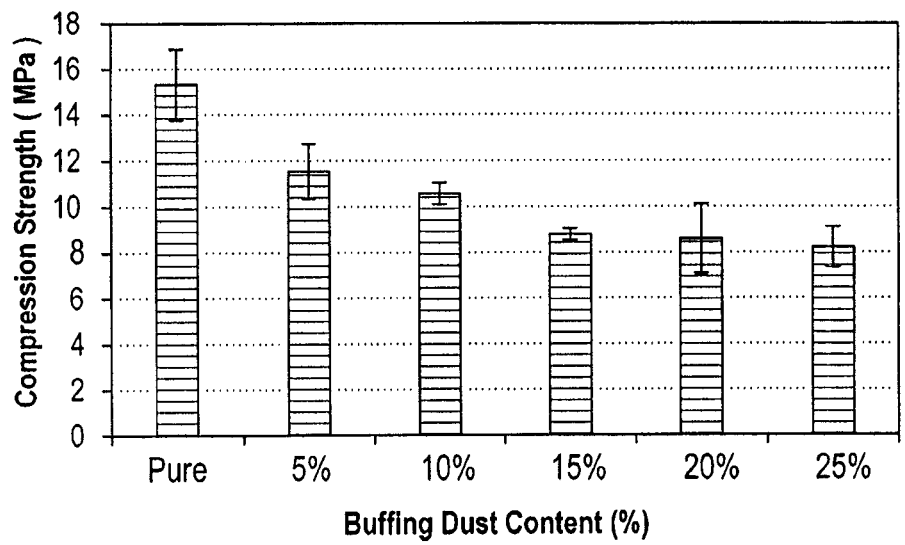
FIG. 6 is a chart of compression strength (MPa) as a function of buffing dust content (wt %) for the buffing dust waste/polystyrene thermal insulator composite material.

FIG. 6 shows the compression strength of the BD waste/polystyrene composites as a function of BD filler content. The added filler particles may act as stress concentration points in the PS matrix or they may have a poor interface with the PS matrix. This may be the reason behind the observed reduction in the compression strength. However, the achieved strengths (15.32 MPa to 8.23 MPa) were higher than that of other insulation materials (2 MPa to 10 MPa). This value could be further improved with more proper mixing.

Figure 7:
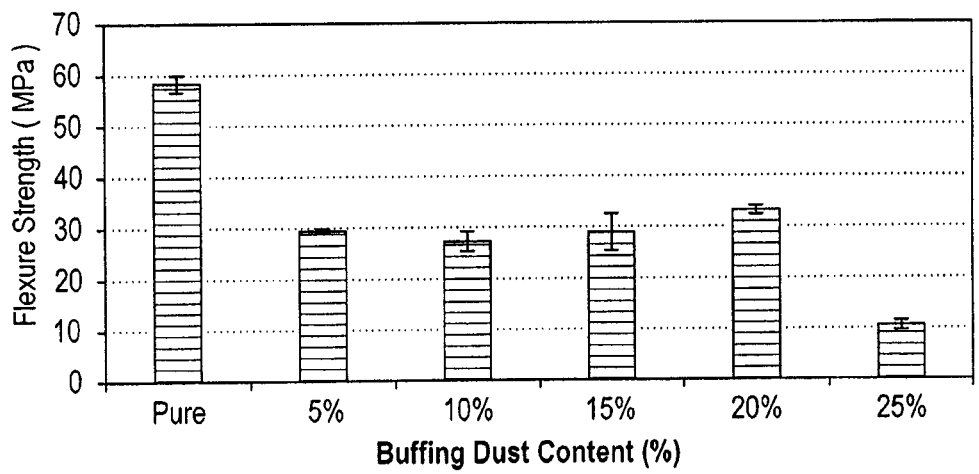
FIG. 7 is a chart of flexure strength (MPa) as a function of buffing dust content (wt %) for the buffing dust waste/polystyrene thermal insulator composite material.

The flexural strength of the BD/PS composites is shown in FIG. 7. The pure PS sample strength was measured to be 58.35 MPa. The value reduced by 49.43% when 5 wt % of BD was added to a PS matrix. However, the flexural strength of 5-BD, 10-BD, 15-BD, and 20-BD wt % composites were almost constant, regardless of the BD filler content, with an average value of 28.20 MPa. For the 25-BD composite, the average flexural strength (19.54 MPa) was slightly lower than the calculated average value for filler contents from 5 wt % to 20 wt %. BD may aggregate, causing poor stress transformation, and this would decrease the flexural properties. However, the flexural strength of these composites was comparable with common commercial thermal insulators.

Figure 8:
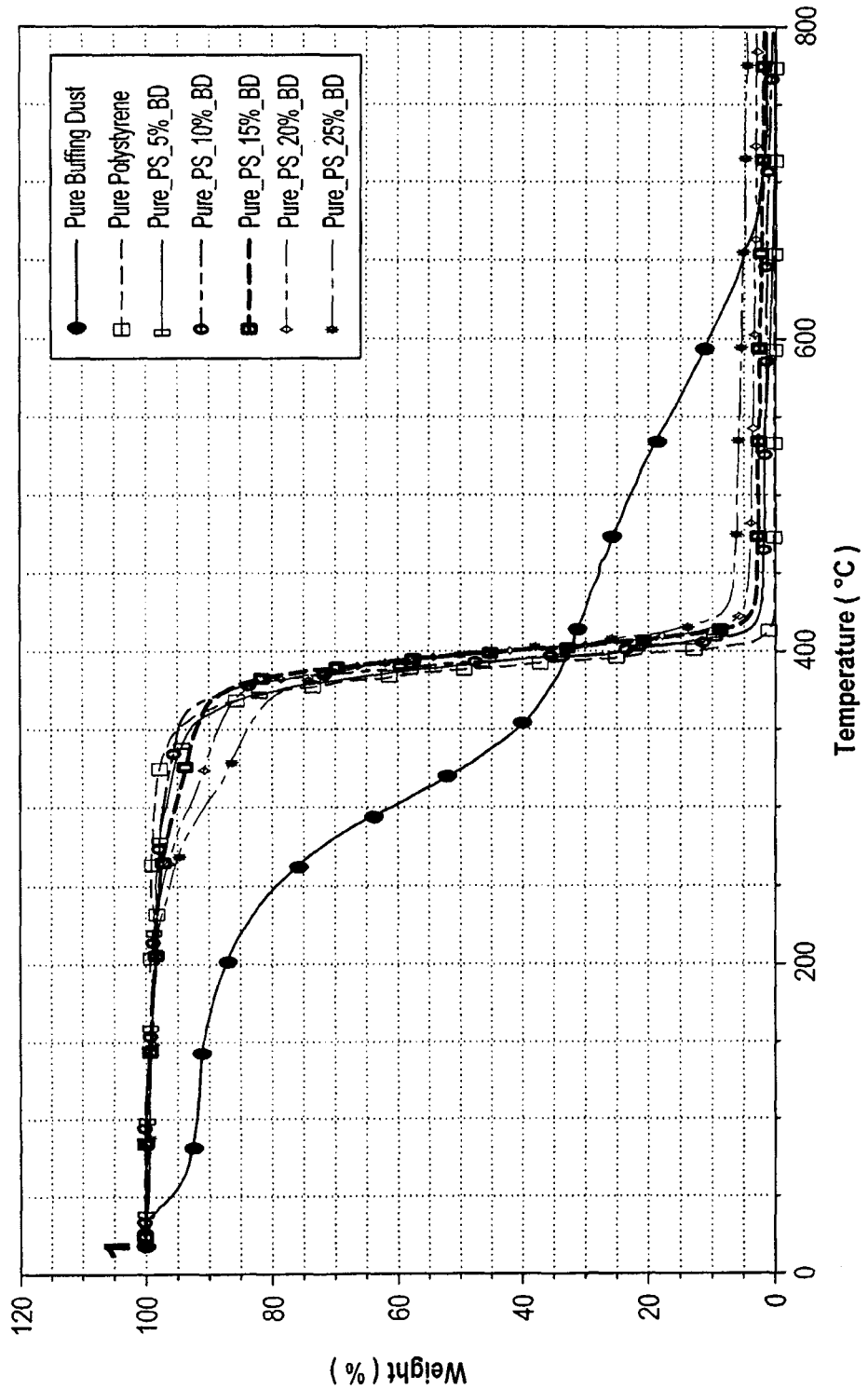
FIG. 8 is a composite of thermograms for the buffing dust waste/polystyrene thermal insulator composite material at buffing dust concentrations of 0 wt %, 5 wt %, 10 wt %, 15 wt %, 20 wt %, and 25 wt %, respectively.

The thermal stability of the buffing dust waste/polystyrene thermal insulator polymer composites was ensured by thermogravimetric analysis. A Q50 TGA analyzer from TA Instruments was used to perform the thermal analyses. A heating rate of 10° C./min was used to increase the temperature from 30° C. to 800° C. under a nitrogen flow of 20 mL/min. The weight loss of the BD-PS composites and the pure materials over the temperature range from 30 to 800° C. is shown in FIG. 8. Pure polystyrene shows a single decomposition step and pure buffing dust waste (BD) decomposes, showing a two-stage decomposition. The composites with 10 wt % BD content or less display the same degradation trend of pure PS. On the other hand, composites with higher BD content (e.g., 25-BD) display a degradation trend similar to pure BD. FIG. 8 also shows that 10% Of BD weight was lost below 150° C. This relatively high weight loss may be explained by the high moisture content in the BD waste. Similar weight reductions at low temperatures for BD were observed in other studies in the literature. The pure BD sample experienced a moderate weight reduction over the temperature range 140 to 260° C. This moderate weight reduction may be due to the crystallized water, oils, and greases in the waste. Furthermore, the higher temperature weight loss may be due to decomposition of the collagen or protein in the waste. The weight loss peaks for BD were found to occur at 49° C. and 296° C. Total weight loss decreases with increasing BD filler content. However, the initial degradation temperature, and consequently thermal stability, slightly decreases with increasing BD content, which caused a slight decline. Generally, the buffing dust waste/polystyrene thermal insulator material is thermally stable up to a temperature much higher than the service temperatures of insulation materials.

Thus, the present buffing dust waste/polystyrene thermal insulator polymer composites exhibit a very low thermal conductivity and good thermal stability while maintaining compression strength and flexural strength, making them suitable for molding into components suitable for use as thermal insulation in buildings. Hence, the polymer composites offer an option for recycling buffing dust waste from leather tanneries, and optionally also for recycling polystyrene discarded into landfills once its useful life as packing material, beverage containers, and the like has terminated.

It is to be understood that the buffing dust waste/polystyrene thermal insulator is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A buffing dust waste/polystyrene thermal insulator, comprising a non-deformable solid thermal insulation component compression molded from a melt blended polymer composite of polystyrene and buffing dust waste from leather tanneries.

2. The buffing dust/polystyrene thermal insulator according to claim 1, wherein said melt blended polymer composite consists of between 0.1% and 25% of said buffing dust waste by weight, the balance being polystyrene.

3. The buffing dust/polystyrene thermal insulator according to claim 1, wherein said melt blended polymer composite consists of 10% of said buffing dust waste by weight, the balance being polystyrene.

4. The buffing dust/polystyrene thermal insulator according to claim 1, wherein said melt blended polymer composite is molded into a non-deformable solid component capable of use as a thermal insulation in a building.

5. A method of making a buffing dust waste/polystyrene thermal insulator, comprising the steps of:
   melt blending buffing dust waste with a polystyrene in an extruder to form a melted polymer composite;
   pouring the melted polymer composite into a mold; and
   compression molding the melted polymer composite in the mold with a hot press machine.

6. The method of making a buffing dust waste/polystyrene thermal insulator according to claim 5, wherein the step of melt blending buffing dust waste with polystyrene further comprises melt blending buffing dust waste in powder form with polystyrene in an extruder to form a melted polymer composite.

7. The method of making a buffing dust waste/polystyrene thermal insulator according to claim 6, wherein the step of melt blending buffing dust waste with polystyrene further comprises melt blending buffing dust waste in powder form with polystyrene beads in an extruder to form a melted polymer composite.

8. The method of making a buffing dust waste/polystyrene thermal insulator according to claim 5, wherein said extruder is a twin-screw extruder.

9. The method of making a buffing dust waste/polystyrene thermal insulator according to claim 5, wherein said step of compression molding the melted polymer composite in the mold with a hot press machine further comprises applying a force of 500 kg to said mold at 180 C for 20 minutes.

10. The method of making a buffing dust waste/polystyrene thermal insulator according to claim 9, wherein said step of compression molding the melted polymer composite in the mold with a hot press machine further comprises applying a force of 500 kg to said mold at 125 C for twenty minutes following said step of applying a force of 180 C for 20 minutes.

11. The method of making a buffing dust waste/polystyrene thermal insulator according to claim 5, wherein said step of melt blending buffing dust waste with polystyrene further comprises melt blending between 0.1% and 25% by weight buffing dust waste with polystyrene.

12. The method of making a buffing dust waste/polystyrene thermal insulator according to claim 5, wherein said step of melt blending buffing dust waste with polystyrene further comprises melt blending 10% by weight buffing dust waste with polystyrene.

13. The method of making a buffing dust waste/polystyrene thermal insulator according to claim 5, wherein said melted polymer composite consists of between 0.1% and 25% by weight buffing dust waste with polystyrene.

14. The method of making a buffing dust waste/polystyrene thermal insulator according to claim 5, wherein said melted polymer composite consists of 10% of said buffing dust waste by weight, the balance being polystyrene.

15. The method of making a buffing dust waste/polystyrene thermal insulator according to claim 5, wherein said mold comprises a mold for thermal insulation capable of providing insulation for a building.

* * * * *